United States Patent Office 3,374,271
Patented Mar. 19, 1968

3,374,271
BENZOCYCLOHEPTEN-6-ONES AND METHODS OF PREPARING THE SAME
Andrew Steven Kende, Nanuet, N.Y., assignor to American Cyanamid Company, Stamford, Conn., a corporation of Maine
No Drawing. Filed Apr. 19, 1967, Ser. No. 631,918
7 Claims. (Cl. 260—590)

ABSTRACT OF THE DISCLOSURE

Novel bridged organic compounds, 5,9-dihydro-5,9-etheno-6H-benzocyclohepten-6-ones, prepared by the reaction of an aryne with tropone or substituted derivatives thereof. The novel compounds exhibit good activity against a broad spectrum of fungi and bacteria.

BRIEF SUMMARY OF THE INVENTION

This invention relates to novel bridged organic compounds and more particularly, the invention relates to new substituted 5,9-dihydro-5,9-etheno - 6H - benzocyclohepten-6-ones and to the preparation thereof.

The novel compounds of the present invention may be represented by the following structural formula:

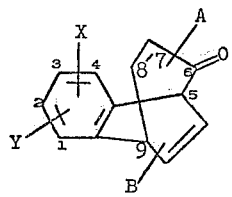

In this structure, X and Y are located on the benzene ring, whereas A and B are located on any two remaining non-carbonyl carbon atoms, wherein X and Y are selected from the group consisting of hydrogen, lower alkyl and halogen; A is selected from the group consisting of hydrogen and halogen; and B is selected from the group hydrogen, halogen and lower alkoxy. The novel compounds of this invention are, in general, off-white crystalline solids which are soluble in the common organic solvents, such as for example, chloroform, ethanol, benzene and the like.

The preparation of the compounds of this invention is illustrated by the following equation:

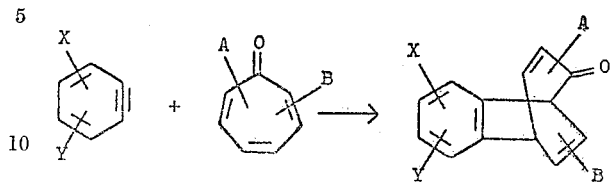

wherein X, Y, A and B are as hereinbefore defined.

Thus, according to the present invention, the novel compounds of this invention are prepared by a novel process comprising the addition of benzyne (or a benzyne derivative), prepared in situ by decomposition of an appropriate precursor (as in the examples and references cited by L. Friedman and F. M. Logullo in J. Am. Chem. Soc. 85, 1549 (1963)) in the presence of tropone or a tropone derivative in an inert solvent such as tetrahydrofuran, methylene chloride and the like. The reaction may be carried out at temperatures ranging from 10° C. to 150° C., but preferably within the range of about 20° to 90° C. Ordinarily, the reaction is completed in one to twenty hours. The crude product remaining after evaporation of the solvent is recovered by extraction and may be further purified by chromatography, sublimation or recrystallization, or by any sequence of such purification methods. Chromatography may be effected over any suitable adsorbent, such as for example, silica gel, magnesium silicate and the like. Recrystallization may be carried out by the use of solvents, such as hexane, methanol, and the like.

The benzyne or benzyne derivative used in the above reaction may be generated, for example, by diazotization of the appropriate anthranilic acid, such as anthranilic acid itself, 5-chloroanthranilic acid, 3,5-dichloroanthranilic acid, 3-methylanthranilic acid, and the like. The tropone starting material may be tropone, 2-chlorotropone, 2,7-dibromotropone, 2-methoxytropone, and the like. The above reaction thus leads to a wide variety of new bridged ketones.

The new compounds of this invention are remarkable and unusual in being biologically active in inhibiting the growth of numerous species of both fungi and bacteria as exemplified in Table I.

TABLE I.—MINIMAL INHIBITORY CONCENTRATIONS IN MICROGRAMS FOR MILLILITER OF MEDIUM

| Organism | 5,9-dihydro-5,9-etheno-6H-benzocyclohepten-6-one | Captan(N-(trichloromethylthio)-4-cyclohexene-1,2-dicarboximide) | Griseofulvin |
|---|---|---|---|
| Bacteria: | | | |
| Mycobacterium smegmatis ATCC 607 | 31 | 62 | *>250 |
| Staphylococcus aureus, st. Rose ATCC 14154 | 31 | 125 | >250 |
| Staphylococcus aureus, st. Smith ATCC 13709 | 31 | 125 | >250 |
| Streptococcus pyogenes C-203 | 31 | 62 | >250 |
| Salmonella typhosa ATCC 6359 | 125 | 250 | >250 |
| Proteus vulgaris ATCC 9484 | 15 | 62 | >250 |
| Klebsiella pneumoniae 53 "A" st. AD | 125 | >250 | >250 |
| Fungi: | | | |
| Candida albicans E-83 | 62 | 2.5 | >250 |
| Cryptococcus neoformans E-138 | 15 | 10 | >250 |
| Tricophyton tonsurans E-10 | 0.6 | 2.5 | |
| Tricophyton mentagrophytes E-11 | 3.1 | 2.5 | 6.2 |
| Tricophyton rubrum E-97 | 1.5 | 5 | 25 |
| Microsporum canis E-55, ATCC 10214 | 1.5 | 2.5 | 6.2 |
| Microsporum gypseum ATCC 14683 | 3.1 | 5 | |
| Phialophora jeanselmei E-16, NIH 8724 | 3.1 | 50 | |

*>250 indicates no activity at the highest level tested; namely, 250 micrograms per milliliter.

The excellent activity against various dermatophytic Tricophyton and Microsporum species (see Table I) coupled with the relative chemical stability of the compounds of this invention make them useful in the treatment of fungal infections of the skin of warm-blooded animals. For such use these compounds may be formulated with appropriate diluents, wetting agents, stabilizing agents, etc. as dusting powders, ointments, creams, lotions, etc. The formulated compounds can be applied topically to the infected skin area.

In addition, because of the relatively low toxicity of the compounds of this invention when administered systemically to warm-blooded animals, these compounds may also be formulated with appropriate diluents, flavorings, excipients, stabilizing agents, etc. and prepared in oral dosage form as tablets, suspensions, soft and hard gelatin capsules and the like.

DETAILED DESCRIPTION

*Example 1.—Preparation of 5,9-dihydro-5,9-etheno-6H-benzocyclohepten-6-one*

To a solution of 4.3 g. of tropone in 90 ml. of dichloromethane at reflux are slowly and simultaneously added over a period of one hour (a) 50 ml. of tetrahydrofuran containing 6.2 g. of anthranilic acid, and (b) 40 ml. of dichloromethane containing 5.2 g. of butyl nitrite. After the addition period of one hour at reflux, the reaction mixture is boiled an additional 15 minutes and cooled. The mixture is then washed first with dilute sodium bicarbonate, followed by a wash with a solution of sodium chloride and finally with water. The dried solution is evaporated to a gum-like residue which is extracted with a hot mixture of ether-petroleum ether (1:1). The extract is chromatographed over silica gel (200 g.) and the column is eluted with petroleum ether-benzene mixtures, and then with benzene. The benzene fractions contain 0.17 g. of the partially-purified product which is recrystallized from methanol yielding the desired product as cream-colored needles, melting point 83° C. The structure of the compound is confirmed by nuclear magnetic resonance, infrared spectra, mass spectrum (parent peak at $m/e=182$), and analysis which agrees closely with the theoretical values for carbon and hydrogen.

*Example 2.—Preparation of 2-chloro-5,9 - dihydro - 5,9-etheno-6H-benzocyclohepten-6-one and 3-chloro - 5,9-dihydro-5,9-etheno-6H-benzocyclohepten-6-one*

A solution of 1.72 g. 5-chloroanthranilic acid in 50 ml. tetrahydrofuran containing a trace of trichloroacetic acid is diazotized at 0° to 10° with 2.5 ml. of isoamyl nitrite. The resulting precipitate of the diazonium carboxylate is washed with tetrahydrofuran by decantation and then allowed to react with 4 ml. of tropone and 0.05 ml. of pyridine in tetrahydrofuran at 40° C. overnight. After removal of solvent, the residue is digested with hot benzene-hexane, and the extracted material chromatographed over silica gel. Elution with 98% benzene-2% ether gives a mixture of 2- and 3-chloro-5,9-dihydro-5,9-etheno-6H-benzocyclohepten-6-one, identified by the characteristic infrared absorption at 5.98μ. The 2- and 3-chloro isomers are separated by chromatography.

*Example 3.—Preparation of 7-methoxy-5,9-dihydro - 5,9-etheno-6H-benzocyclohepten-6-one*

A suspension of o-benzenediazonium carboxylate in tetrahydrofuran is prepared by diazotization of 1.3 g. anthranilic acid with 2.5 ml. isoamyl nitrite in the manner illustrated in Example 2. To this suspension is added 1.0 g. of 2-methoxy-tropone and the resulting mixture stirred at 40° C. overnight. Removal of solvent and chromatography of the resulting residue over magnesium silicate gives, upon elution with ether-benzene mixtures, the desired methoxyketone as a tan solid, identified by infrared and n.m.r. spectroscopy as the 7-methoxy derivative.

*Example 4.—Preparation of 1-methyl-5,9 - dihydro - 5,9-etheno-6H-benzocyclohepten-6-one*

A suspension of 3-methyl-2-benzenediazonium 1-carboxylate is prepared in the usual manner from 1.5 g. 3-methyl-2-aminobenzoic acid and 2.5 ml. isoamyl nitrite in tetrahydrofuran. To the washed diazonium salt is added 1.2 ml. tropone in 30 ml. tetrahydrofuran, and the reaction mixture stirred at 40–45° C. for sixteen hours. Removal of solvent gives a residue which is extracted by hot benzene-hexane and the extract chromatographed over magnesium silicate. Elution with benzene-ether mixtures gives the 1-methyl compound as a low melting solid having carbonyl absorption at 5.99μ.

What is claimed is:

1. A compound of the formula:

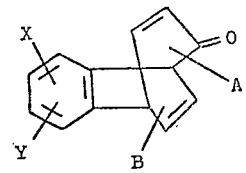

wherein X and Y are selected from the group consisting of hydrogen, lower alkyl and halogen; A is selected from the group consisting of hydrogen and halogen; and B is selected from the group consisting of hydrogen, halogen and lower alkoxy.

2. The compound according to claim 1: 5,9-dihydro-5,9-etheno-6H-benzocyclohepten-6-one.

3. The compound according to claim 1: 2-chloro-5,9-dihydro-5,9-etheno-6H-benzocyclohepten-6-one.

4. The compound according to claim 1: 3-chloro-5,9-dihydro-5,9-etheno-6H-benzocyclohepten-6-one.

5. The compound according to claim 1: 7-methoxy-5,9-dihydro-5,9-etheno-6H-benzocyclohepten-6-one.

6. The compound according to claim 1: 1-methyl-5,9-dihydro-5,9-etheno-6H-benzocyclohepten-6-one.

7. A method of preparing compounds of the formula:

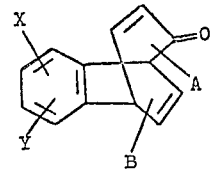

wherein X and Y are selected from the group consisting of hydrogen, lower alkyl and halogen; A is selected from the group consisting of hydrogen and halogen; and B is selected from the group consisting of hydrogen, halogen, and lower alkoxy which comprises contacting a compound of the formula:

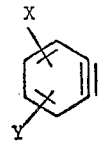

wherein X and Y are as defined above, with a compound of the formula:

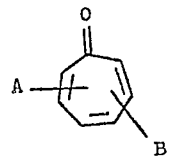

wherein A and B are as defined above, in an inert solvent.

References Cited

Hoffmann: Naturwissenschten, 52, 655–658 (1965).

DANIEL D. HORWITZ, *Primary Examiner.*